(12) United States Patent  
Alattar et al.

(10) Patent No.: US 12,424,842 B2
(45) Date of Patent: Sep. 23, 2025

(54) OVERLOAD PROTECTION SYSTEM INCLUDES A LOAD MANAGEMENT SYSTEM HAVING A MONITORING RELAY WITH A "THRESHOLD HYSTERESIS" BUILT-IN

(71) Applicant: Siemens Industry, Inc., Alpharetta, GA (US)

(72) Inventors: Nezar Alattar, Buford, GA (US); Tim Curtis, Tucker, GA (US); Gustavo Cortes Rico, Suwanee, GA (US); Carlos Flores Silguero, Doraville, GA (US); Hector Malacara, Alpharetta, GA (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 149 days.

(21) Appl. No.: 18/319,134

(22) Filed: May 17, 2023

(65) Prior Publication Data
US 2024/0388079 A1 Nov. 21, 2024

(51) Int. Cl.
*H02H 7/22* (2006.01)
*H02B 1/24* (2006.01)
*H02H 1/00* (2006.01)
*H02H 1/04* (2006.01)

(52) U.S. Cl.
CPC ............ *H02H 7/22* (2013.01); *H02B 1/24* (2013.01); *H02H 1/04* (2013.01); *H02H 1/0007* (2013.01)

(58) Field of Classification Search
CPC .......... H02B 1/24; H02H 1/0007; H02H 1/04; H02H 3/08; H02H 7/22; H02H 7/261; H02J 13/00001; H02J 13/00002; H02J 2310/48; H02J 2310/60; H02J 3/14; H02J 7/0068

See application file for complete search history.

(56) References Cited

U.S. PATENT DOCUMENTS

2003/0020333 A1* 1/2003 Ying ................. H02J 13/00004
307/38
2006/0018069 A1* 1/2006 Gull ......................... H02J 3/14
361/90

(Continued)

FOREIGN PATENT DOCUMENTS

ES 2905578 T3 * 4/2022 .............. H02J 9/005

*Primary Examiner* — Rexford N Barnie
*Assistant Examiner* — Nicolas Bellido

(57) ABSTRACT

An overload protection system includes a panelboard and a load management system (LMS) which is configured to constantly measure the total amount of power being used at the panelboard such that when the total amount of energy measured is at or above a high programmed level, the LMS stops power from being supplied to a load and when the total amount of energy measured is at or below a low programmed level, the LMS allows power to be supplied to the load. The LMS includes a monitoring relay with a "threshold hysteresis" built-in, which means that a threshold current at which an output switches from one state to another state is different depending on whether an input current is increasing or decreasing. The "threshold hysteresis" helps to eliminate noise and ensure that the output switches cleanly between ON and OFF, even if an input current level is fluctuating around a threshold current level.

25 Claims, 9 Drawing Sheets

(56) References Cited

U.S. PATENT DOCUMENTS

| | | | |
|---|---|---|---|
| 2010/0152914 A1* | 6/2010 | Ying | H01H 9/32 700/295 |
| 2017/0279273 A1* | 9/2017 | Tischer | H02J 3/00 |
| 2023/0028679 A1* | 1/2023 | Fulton | H01R 31/065 |
| 2023/0120740 A1* | 4/2023 | Lewchuk | B60L 53/665 320/109 |

* cited by examiner

OVERLOAD PROTECTION SYSTEM INCLUDES A LOAD MANAGEMENT SYSTEM HAVING A MONITORING RELAY WITH A "THRESHOLD HYSTERESIS" BUILT-IN

BACKGROUND

1. Field

Aspects of the present invention generally relate to an overload protection system for electrical distribution equipment, which includes a load management system (LMS) including a monitoring relay in which a "threshold hysteresis" is built-in such that a threshold current at which an output switches from one state to another state is different depending on whether an input current is increasing or decreasing.

2. Description of the Related Art

Large electrical loads, for example, electric vehicles may overload a feeding panel capacity when the system was not originally intended for such high consumption levels. This problem has been solved up to now by replacing the feeding panel and wiring to allow for higher loads. This problem also has been solved up to now by adding monitoring and control systems that only allow power to large loads only when there is enough capacity in the feeding panel.

Therefore, there is a need for a load management system for use with an overload protection system of electrical distribution equipment.

SUMMARY

Briefly described, aspects of the present invention relate to an overload protection system for electrical distribution equipment, which includes a load management system (LMS) including a monitoring relay in which a "threshold hysteresis" is built-in such that a threshold current at which an output switches from one state to another state is different depending on whether an input current is increasing or decreasing. Instant invention continuously monitors the total energy consumption of a main panel and turns on/off power to a large load depending on when enough capacity is available. Invention uses a "threshold hysteresis" built-in in a monitoring relay of the LMS, which means that the threshold current at which the output switches from one state to another is different depending on whether the input current is increasing or decreasing. This helps to eliminate noise and ensure that the output switches cleanly between on and off, even if the input current level is fluctuating around the threshold current level. A device is installed between the load and the load center/power panel.

In accordance with one illustrative embodiment of the present invention, an overload protection system for electrical distribution equipment is provided. The overload protection system comprises a panelboard as a component of an electrical distribution system which divides an electrical power feed into branch circuits, while providing a branch circuit breaker or a fuse for each branch circuit. The overload protection system includes a load management system (LMS) including a circuit breaker or a fuse (for control power). Another embodiment could also include a breaker/fuse for the load connected to the LMS (if the power source is from somewhere other than the load center). The LMS is configured to constantly measure the total amount of energy being used at the panelboard such that when the total amount of energy measured is at or above a high programmed level, the LMS stops power from being supplied to a load and when the total amount of energy measured is at or below a low programmed level, the LMS allows power to be supplied to the load. The LMS comprises a monitoring relay in which a "threshold hysteresis" is built-in, which means that a threshold current at which an output switches from one state to another state is different depending on whether an input current is increasing or decreasing. Hysteresis is configured such that when the load is switched off by LMS (due to exceeding "high program level"), the device will not switch back until capacity is available in a system to feed LMS-connected load. The "threshold hysteresis" helps to eliminate noise and ensure that the output switches cleanly between ON and OFF, even if an input current level is fluctuating around a threshold current level.

In accordance with one illustrative embodiment of the present invention, a method for providing an overload protection system for electrical distribution equipment is provided. The method comprises providing a panelboard as a component of an electrical distribution system which divides an electrical power feed into branch circuits, while providing a branch circuit breaker or a fuse for each branch circuit. The method further comprises providing a load management system (LMS) including a circuit breaker. The LMS is configured to constantly measure the total amount of energy being used at the panelboard such that when the total amount of energy measured is at or above a high programmed level, the LMS stops power from being supplied to a load and when the total amount of energy measured is at or below a low programmed level, the LMS allows power to be supplied to the load. The LMS comprises a monitoring relay in which a "threshold hysteresis" is built-in, which means that a threshold current at which an output switches from one state to another state is different depending on whether an input current is increasing or decreasing. The "threshold hysteresis" helps to eliminate noise and ensure that the output switches cleanly between ON and OFF, even if an input current level is fluctuating around a threshold current level.

In accordance with one illustrative embodiment of the present invention, a kit of a load management system (LMS) for forming an overload protection system for electrical distribution equipment is provided. The kit comprises a plurality of current transformers (CT's), a circuit breaker or other overcurrent protective device (OCPD), a monitoring relay and a contactor. The plurality of current transformers (CT's), the circuit breaker, the monitoring relay and the contactor all mounted on a plate and all prewired or not with connections between the circuit breaker, the monitoring relay and the contactor except the plurality of current transformers CTs. The kit is configured to be installed in the field.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

Figure 1:
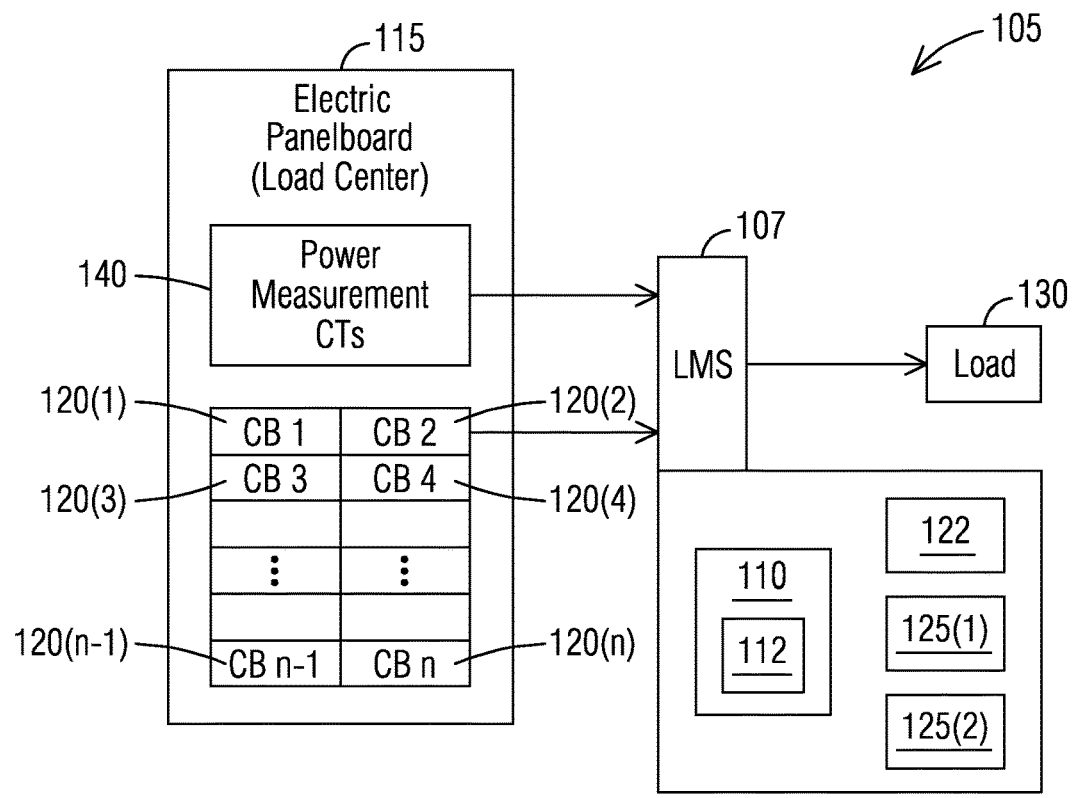
FIG. 1 illustrates an overload protection system for electrical distribution equipment, which includes a load management system (LMS) including a monitoring relay in which a "threshold hysteresis" is built-in in accordance with an exemplary embodiment of the present invention.

Various technologies that pertain to systems and methods that facilitate an overload protection system for electrical distribution equipment, which includes a load management system (LMS) will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

To facilitate an understanding of embodiments, principles, and features of the present invention, they are explained hereinafter with reference to implementation in illustrative embodiments. In particular, they are described in the context of an overload protection system for electrical distribution equipment, which includes a load management system (LMS). Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

These and other embodiments of the overload protection system according to the present disclosure are described below with reference to FIGS. 1-11 herein. Like reference numerals used in the drawings identify similar or identical elements throughout the several views. The drawings are not necessarily drawn to scale.

Consistent with one embodiment of the present invention, FIG. 1 represents an overload protection system 105 in accordance with an exemplary embodiment of the present invention. The overload protection system 105 is for electrical distribution equipment. The overload protection system 105 includes a load management system (LMS) 107 including an energy monitoring device or other supervisory controller, such as a monitoring relay 110 in which a "threshold bysteresis" 112 is built-in in accordance with an exemplary embodiment of the present invention. The overload protection system 105 comprises a panelboard 115 as a component of an electrical distribution system which divides an electrical power feed into branch circuits, while providing a branch circuit breaker 120(1–n) or a fuse for each branch circuit.

The overload protection system 105 further comprises the load management system (LMS) 107 including a circuit breaker 122 or other OCPD. The LMS 107 is configured to constantly measure the total amount of energy being used at the panelboard 115 such that when the total amount of energy measured is at or above a high programmed level 125(1), the LMS 107 stops power from being supplied to a load 130 and when the total amount of energy measured is at or below a low programmed level 125(2), the LMS 107 allows power to be supplied to the load 130.

The LMS 107 further comprises the monitoring relay 110 in which the "threshold hysteresis" 112 is built-in, which means that a threshold current at which an output switches from one state to another state is different depending on whether an input current is increasing or decreasing. The "threshold hysteresis" 112 of the monitoring relay 110 assists to substantially eliminate noise and ensure that the output switches cleanly or accurately between ON and OFF, even if an input current level 135(1) is fluctuating around a threshold current level 135(2). The term "cleanly" or "accurately" mean that the switching from on to off or off to on is without an unstable or unwanted consequences. For example, the noise can be eliminated with the use of one or more Schmitt triggers or the like and the use of comparators may be done to compare the "threshold levels". The measurement of levels may be referenced as energy being used by the panelboard 115.

The panelboard 115 further comprises a plurality of current transformers (CT's) 140 that are installed on the line side of equipment where LMS applications are needed. The panelboard 115 is a distribution board which is a component of an electricity supply system that divides an electrical power feed into subsidiary circuits while providing a protective fuse or a circuit breaker for each circuit in a common enclosure. The overload protection system 105 uses an overload relay to prevent current from flowing through the electrical distribution equipment when an overload occurs. This method will cause the electrical distribution equipment to stop running immediately, and industrial applications will also stop.

Figure 2:
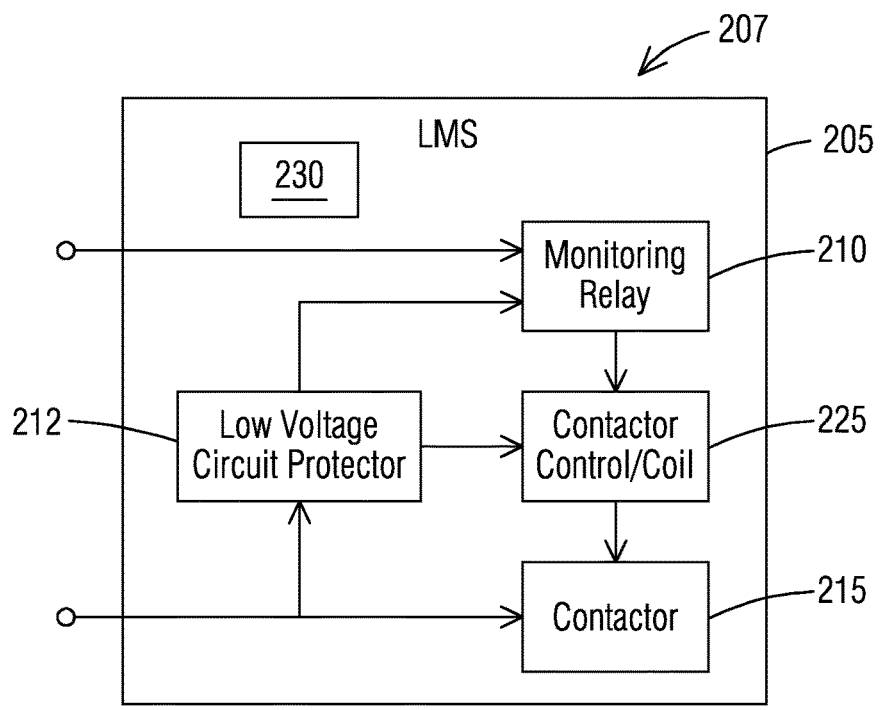
FIG. 2 illustrates a load management system (LMS) in accordance with an exemplary embodiment of the present invention.

Referring to FIG. 2, it illustrates a load management system (LMS) 207 in accordance with an exemplary embodiment of the present invention. The LMS 207 further comprises an enclosure 205 to house LMS components. The LMS 207 further comprises a low power circuit protector 212 being the circuit breaker or a fuse to protect low power wiring and components.

The LMS 207 further comprises a switching device such as a contactor 215 controlled by a monitoring relay 210. The contactor acts as a switch between the branch circuit breaker 120(1) in the panelboard 115 and the load 130. The contactor 215 has a coil 225 and an on-off mechanism which is controlled by the monitoring relay 210 such that the monitoring relay 210 provides or suspends power to the coil 225.

In operation, the monitoring relay 210 receives power from the branch circuit breaker 120(1). The monitoring relay 210 receives the power to function, from the circuit breaker 212 inside the LMS 207. The monitoring relay 210 is also connected to the branch circuit breaker 120(1) but it acts as a switch between the branch circuit breaker 120(1) and the coil 225 in the contactor 215. The monitoring relay 210 holds a program 230 with high/low limits to operate the contactor 215.

An overload protection system further comprises the control/coil 225 as part of a unit of the contactor 215. The contactor 215 opens or closes a circuit to the load 130. The load 130 may be any electrical load including an electrical vehicle (EV) charger, a water heater, or a pump.

In one embodiment, the LMS 207 may be a solid-state unit where the contactor 215, the monitoring relay 210 and low power protection are configured and built to be a single unit. The solid-state unit of the LMS 207 may be configured to be installed in a box by itself. The solid-state (SS) unit may be in a sub-panel by itself. If so, this overload protection system could be consolidated to all in a part of the branch circuit breakers in the upstream panelboard. The solid-state unit of the LMS 207 may be configured to be installed inside as a component of an electrical distribution system. The LMS 207 may comprise a solid-state circuit breaker (SSCB) in one embodiment. The solid-state unit could also extend to other parts of the system (such as the branch circuit breaker).

In one embodiment, the LMS 207 transmits status of a state to another supervisory system. Through communicating means LMS threshold values can be modified, operation can also be done remotely, as well as monitoring of status can be done. The LMS 207 can communicate to another LMS within the same facility such that control of one LMS can be a result from another LMS. The LMS 207 monitors wires that are part of a system that provides energy level for wire-breaks. The LMS 207 can select between two sources depending on an available energy level.

The LMS 207 measures available energy from a reference source, once available energy level drops below a threshold level, source selection is switched to another source until reference source available energy level has returned to a nominal state. Threshold available energy level at which an output switches from one state to another state is different depending on whether the available energy is increasing or decreasing, and wherein the "threshold hysteresis" helps to eliminate noise and ensure that the output switches cleanly between two sources even if available energy level is fluctuating around a threshold available energy level.

The LMS 207 can be controlled remotely by a user via a mobile app or other common means such that communication occurs between the user and a supervisory controller/hub/gateway such as the monitoring relay. The supervisory controller sends/receives commands to/from a connected load. The LMS 207 can set a power demand for compatible devices with communication, such as EV Chargers. The LMS 207 uses a HIGH level from the "threshold hysteresis" to reduce a load level dynamically to a connected load. Schedules can be programmed for time-of-use or other common load management methods based on learned user habits. The learned user habits can be manually programmed by a user or trained using an artificial intelligence program in a supervisory controller such as the monitoring relay. In the context of switching a load on/off, an embodiment may dynamically reduce power demand from specific loads (such as EV chargers).

Figure 3:
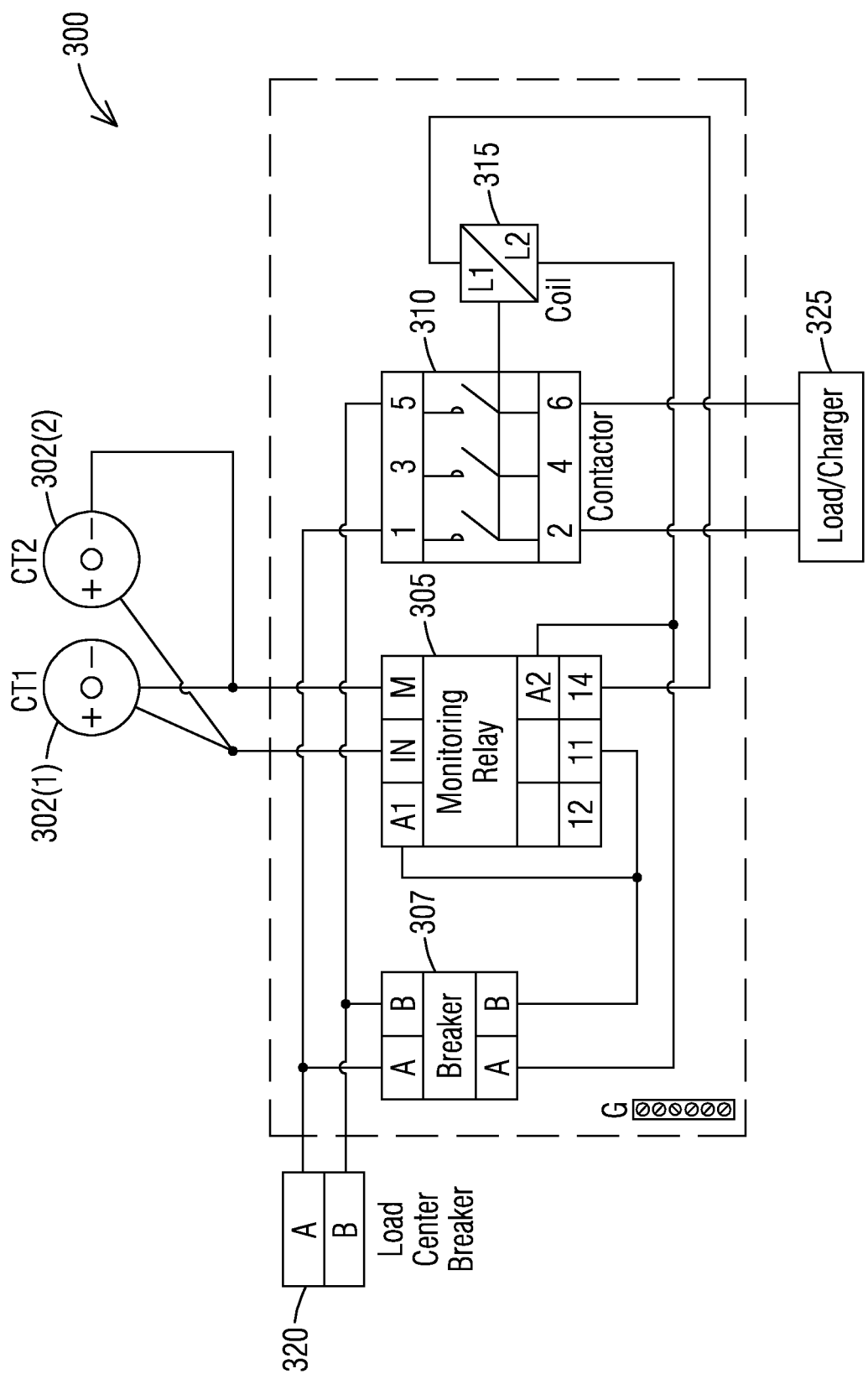
FIG. 3 illustrates a wiring diagram in accordance with an exemplary embodiment of the present invention.

Turning now to FIG. 3, it illustrates a wiring diagram 300 in accordance with an exemplary embodiment of the present invention. Connections between Current Transformers CT1 and CT2 302(1-2) and a monitoring relay 305. A breaker 307, a contactor 310, a coil 315 a load center breaker 320 and a load as an EV charger 325 are shown. In a system of all SS units, the energy monitoring of the panelboard could also be derived by mathematical sum of each individual branch circuit.

Figure 4:
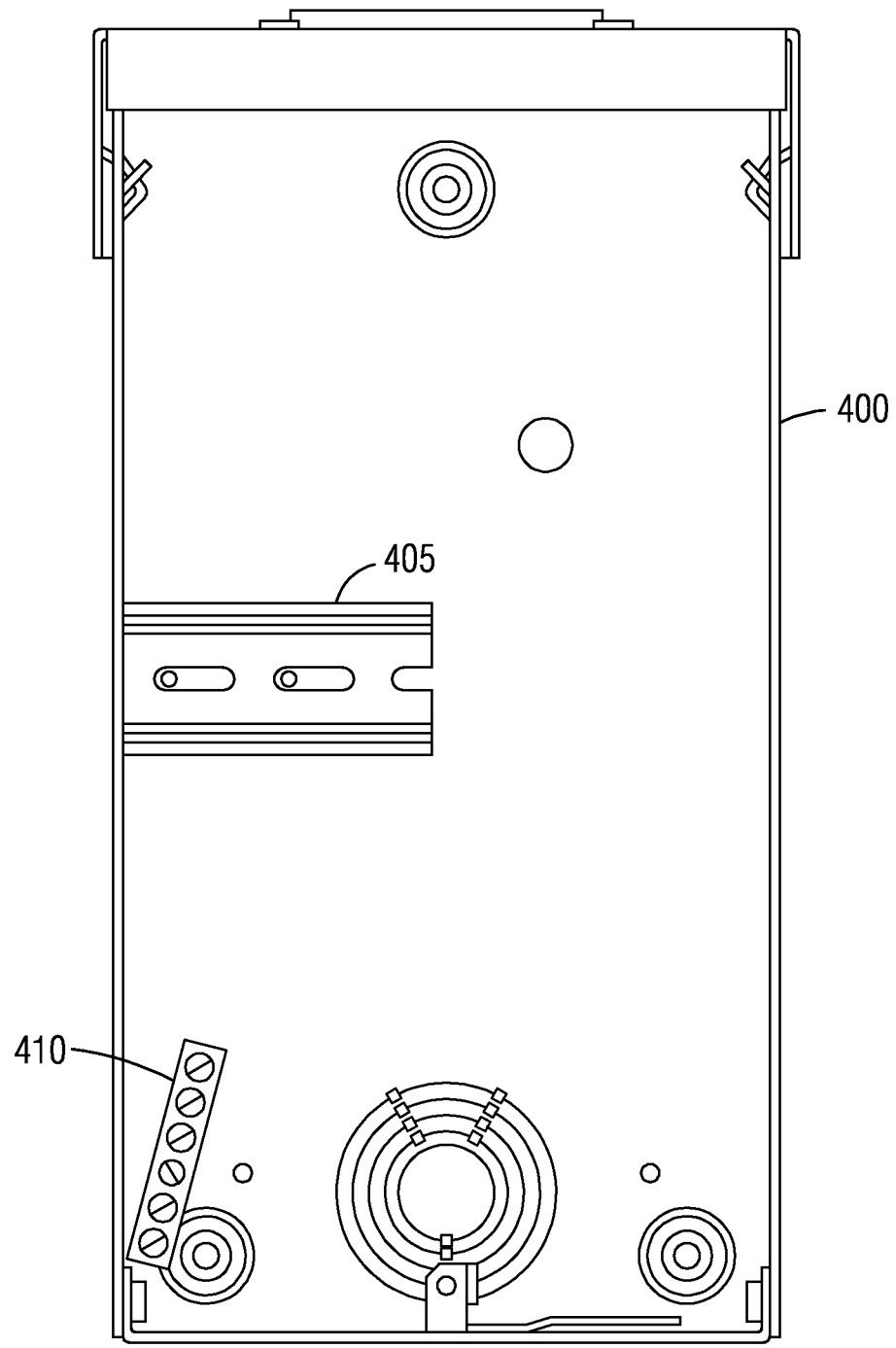
FIG. 4 illustrates an enclosure in accordance with an exemplary embodiment of the present invention.

FIG. 4 illustrates an enclosure box 400 in accordance with an exemplary embodiment of the present invention. FIG. 4 shows a din rail 405 as a provision for mounting a circuit breaker and a monitoring relay. A contactor is installed directly to the back of the enclosure box 400 with screws. A ground bar 410 is also provided such that it is accessible externally for required ground connections.

Figure 5:
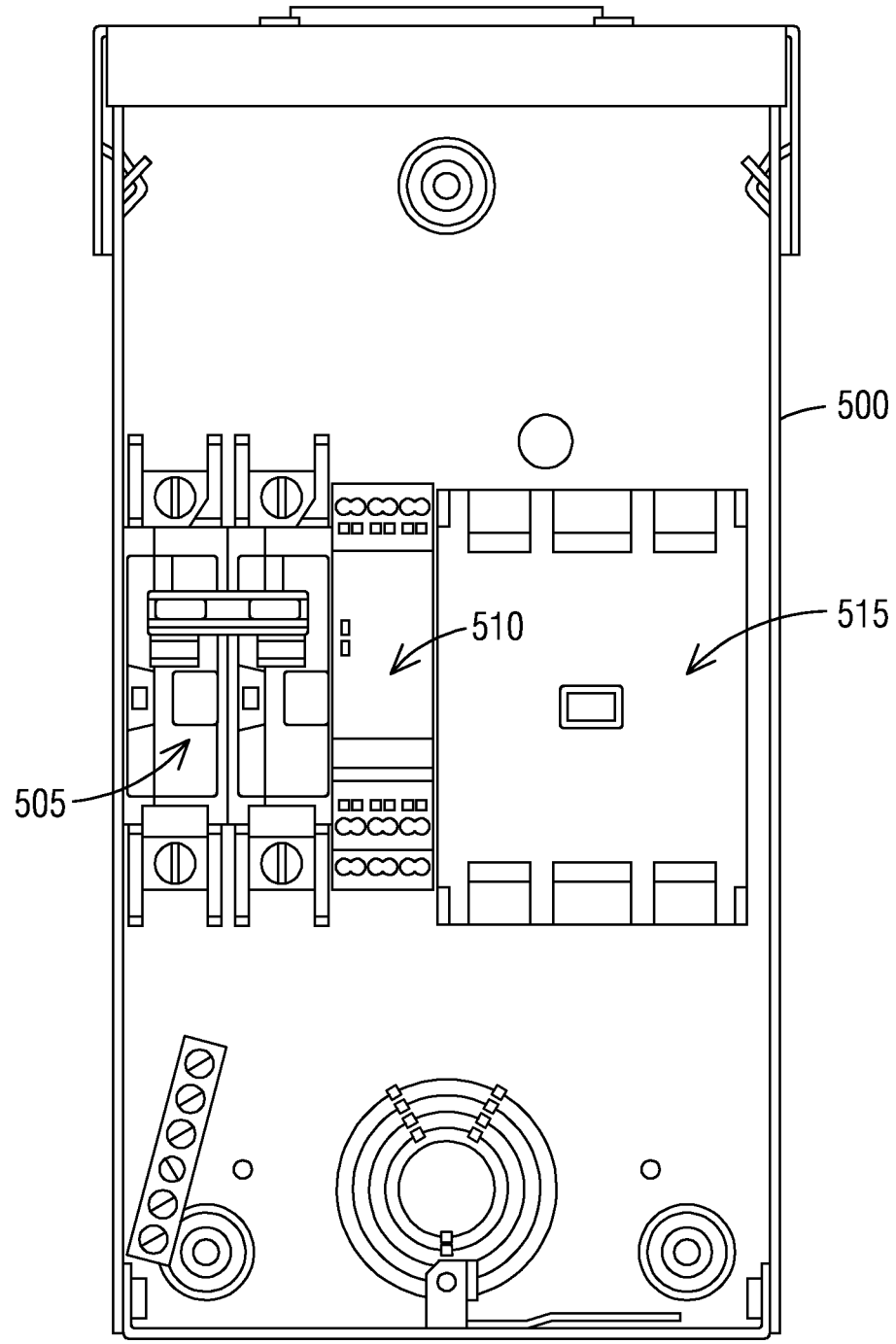
FIG. 5 illustrates an enclosure with main components installed in accordance with an exemplary embodiment of the present invention.

As seen in FIG. 5, it illustrates an enclosure 500 with main components installed in accordance with an exemplary embodiment of the present invention. A breaker 505, a monitoring relay 510 and a contactor 515 are shown installed.

Figure 6:
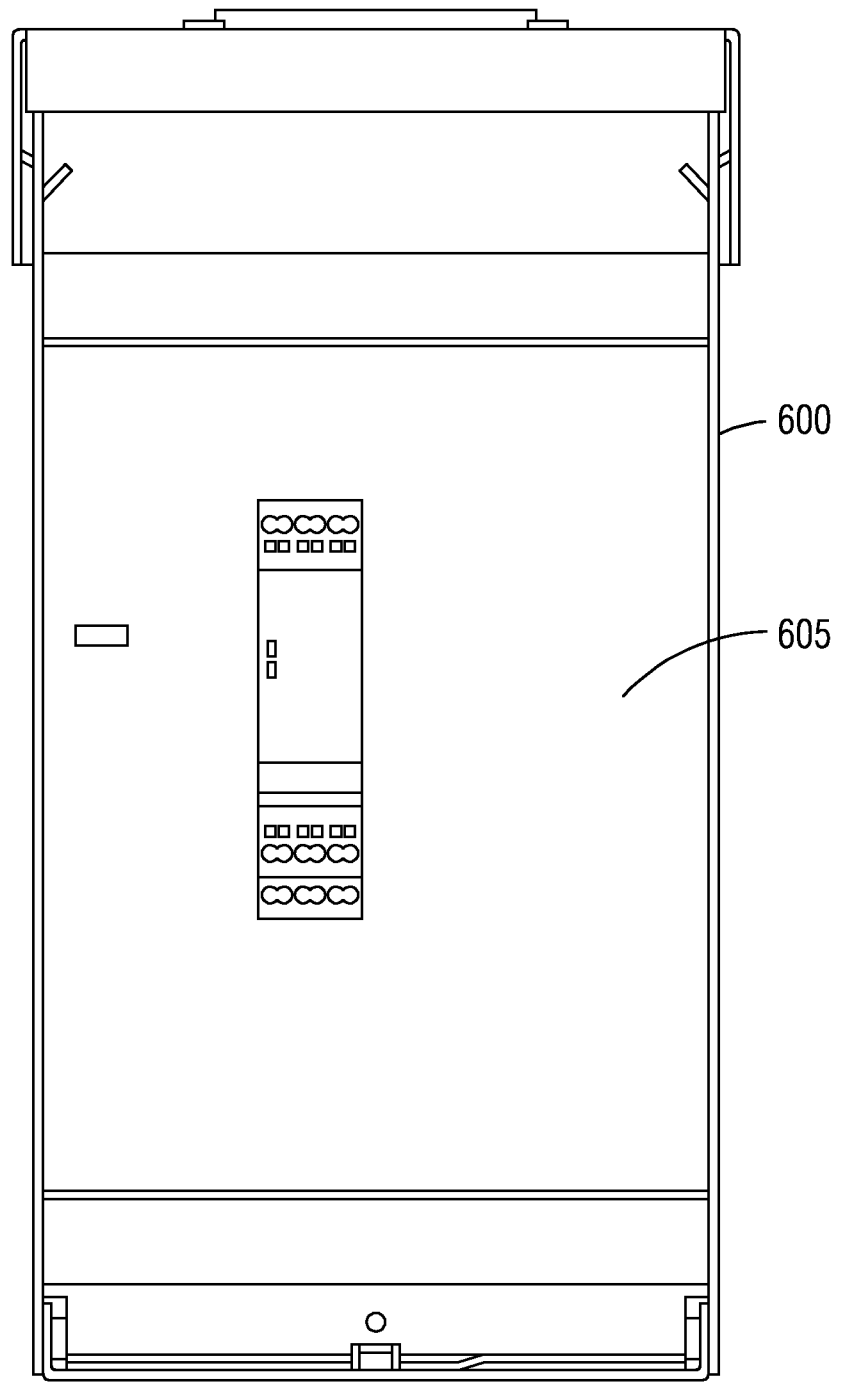
FIG. 6 illustrates an enclosure with electrical components installed and covered by a touch safe internal cover in accordance with an exemplary embodiment of the present invention.

As shown in FIG. 6, it illustrates an enclosure 600 with electrical components installed and covered by a touch safe internal cover 605 (deadfront) in accordance with an exemplary embodiment of the present invention. The deadfront prevents users from touching live parts, allows users to see the monitoring relay screen and allows access to the programming buttons on the monitoring relay.

Figure 7:
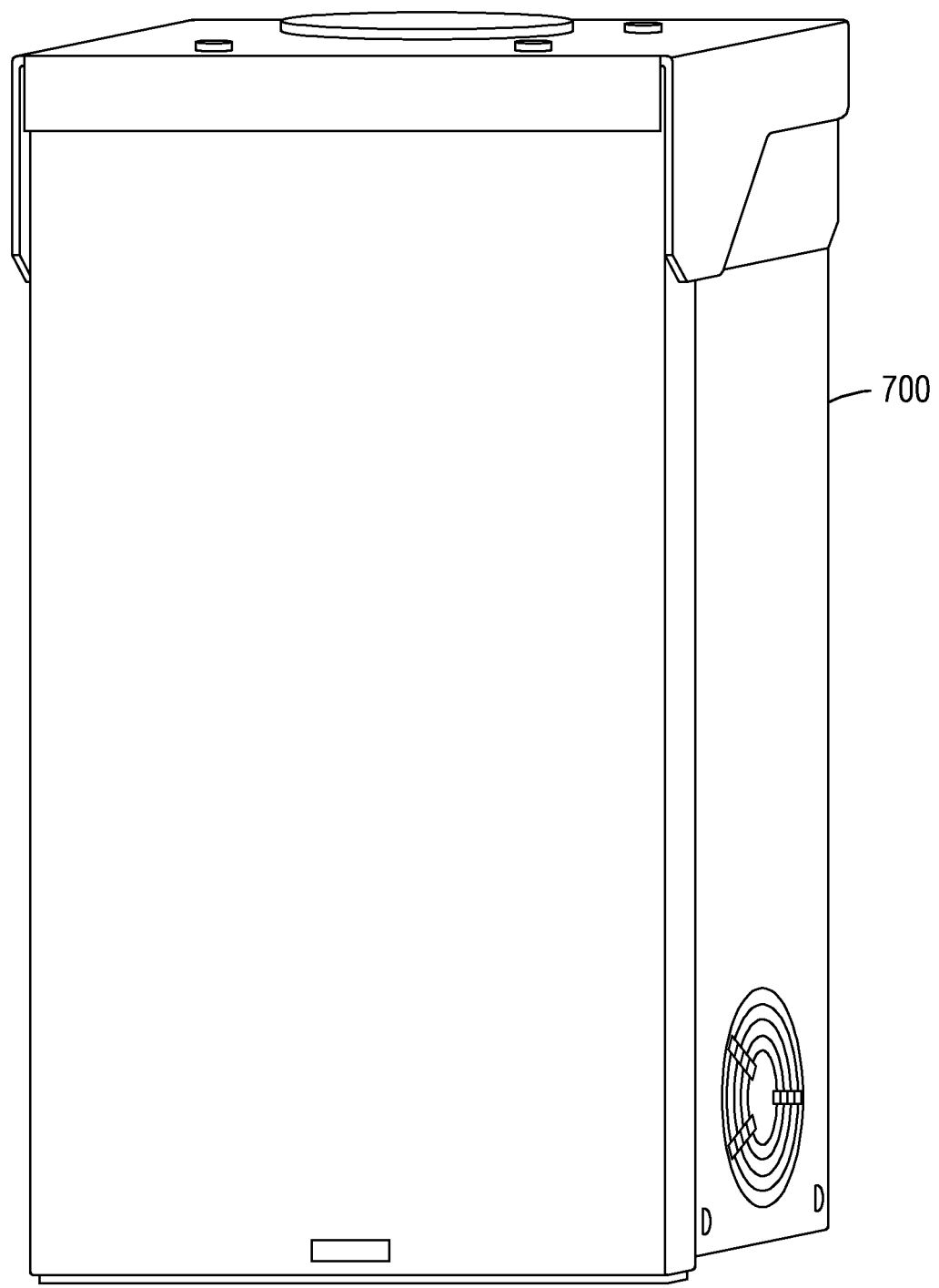
FIG. 7 illustrates an enclosure fully assembled in accordance with an exemplary embodiment of the present invention.

In FIG. 7, it illustrates an enclosure 700 fully assembled in accordance with an exemplary embodiment of the present invention. Units may be shipped with provisions for installing electrical conduit as seen on the top of the enclosure 700. If conduit provisions are installed, then a kit to close the openings is shipped with the enclosure 700 in case the installation requires it.

In addition to having a unit dedicated to house the components for a load manager, the components may be used inside enclosures that have other applications.

Figure 8:
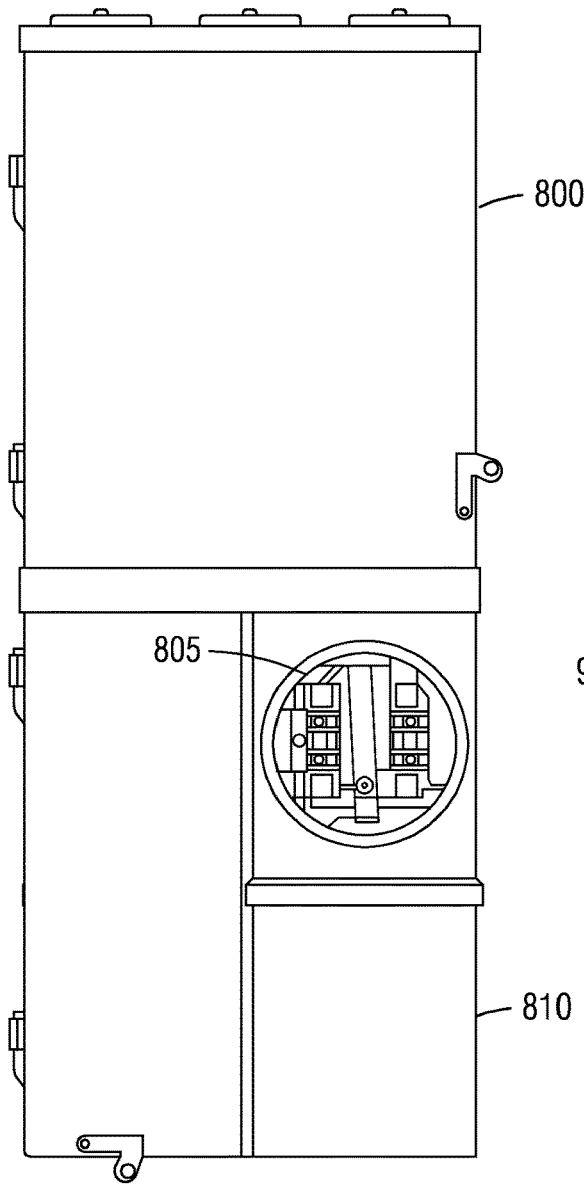
FIG. 8 illustrates an enclosure with a Meter Combo which is a combination of a meter socket and a load center in accordance with an exemplary embodiment of the present invention.

With regard to FIG. 8, it illustrates an enclosure 800 with a Meter Combo which is a combination of a meter socket 805 and a load center 810 in the same enclosure 800 in accordance with an exemplary embodiment of the present invention. For an overload protection system, the enclosure 800 to house an electrical distribution equipment which is a combination of the meter socket 805 and the load center 810. Load manager components for this case may be sold separately as an accessory.

Figure 9:
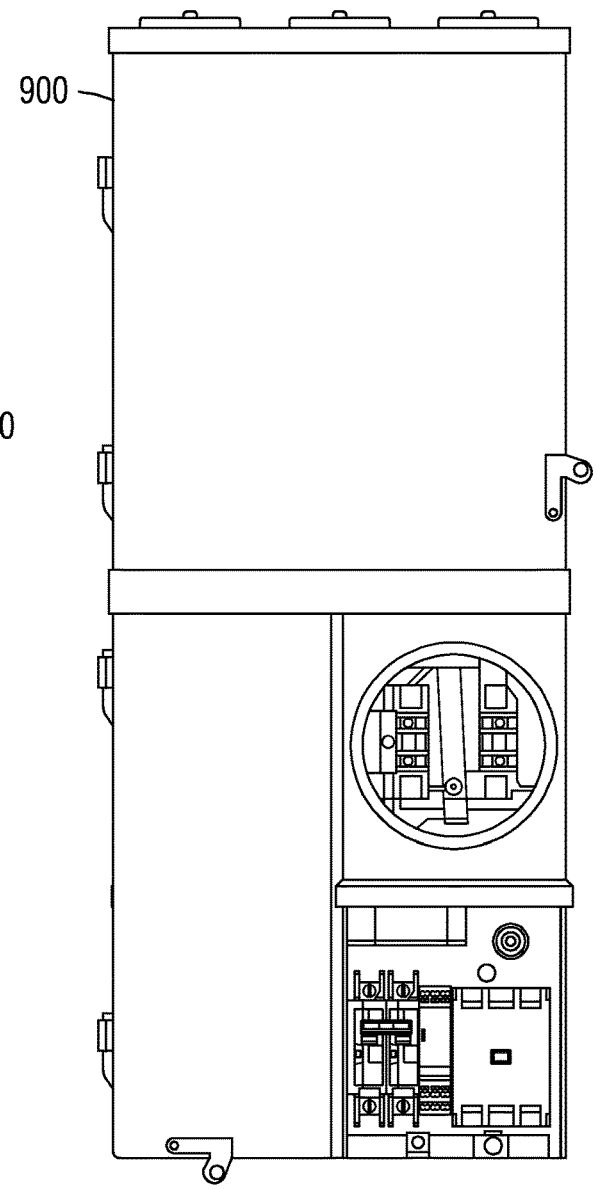
FIG. 9 illustrates load manager components to be sold separately as an accessory in accordance with an exemplary embodiment of the present invention.

With respect to FIG. 9, it illustrates load manager components of an enclosure 900 to be sold separately as an accessory in accordance with an exemplary embodiment of the present invention.

Figure 10:
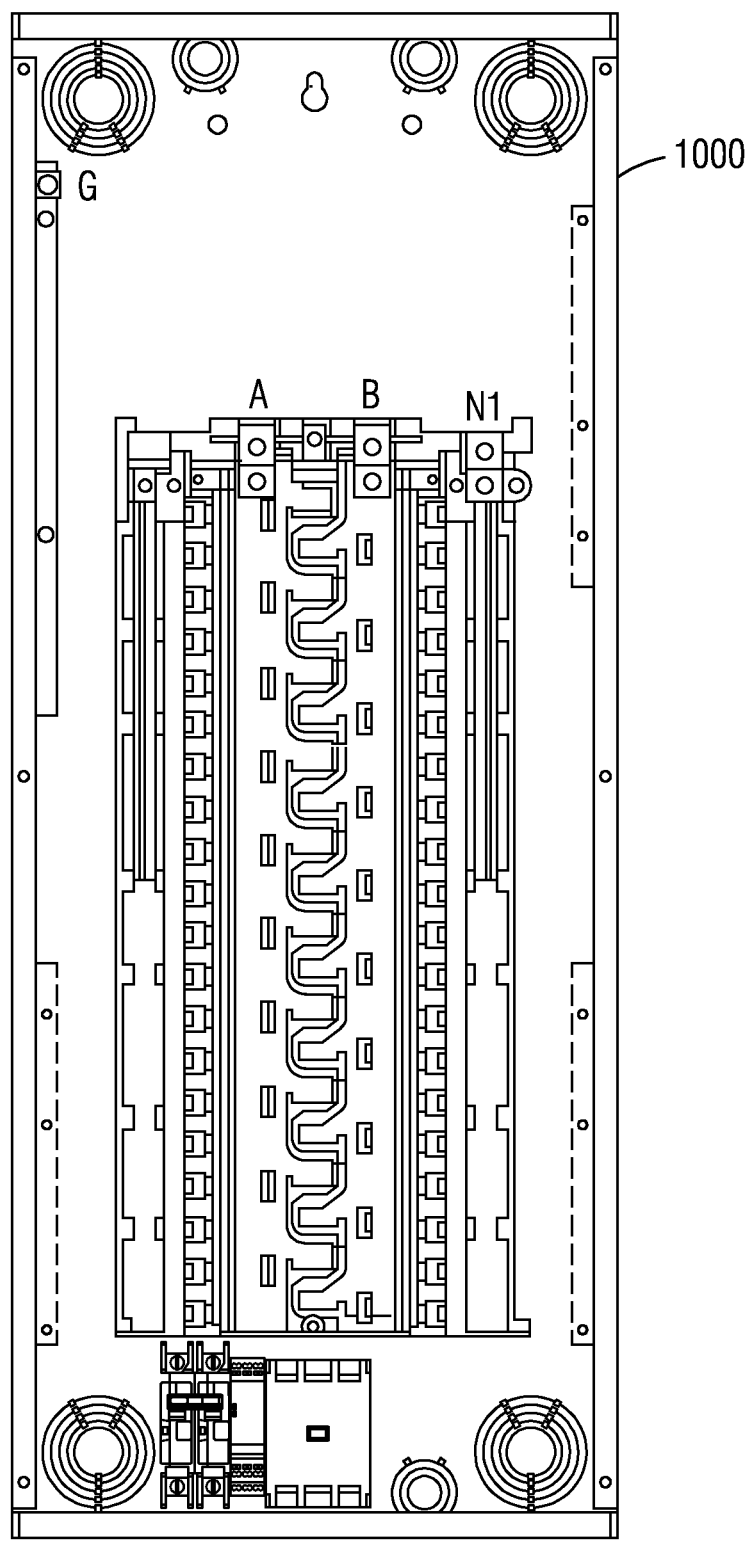
FIG. 10 illustrates a view in which a cover is removed in accordance with an exemplary embodiment of the present invention.

FIG. 10 illustrates a view in which a cover is removed from an enclosure 1000 in accordance with an exemplary embodiment of the present invention.

Figure 11:
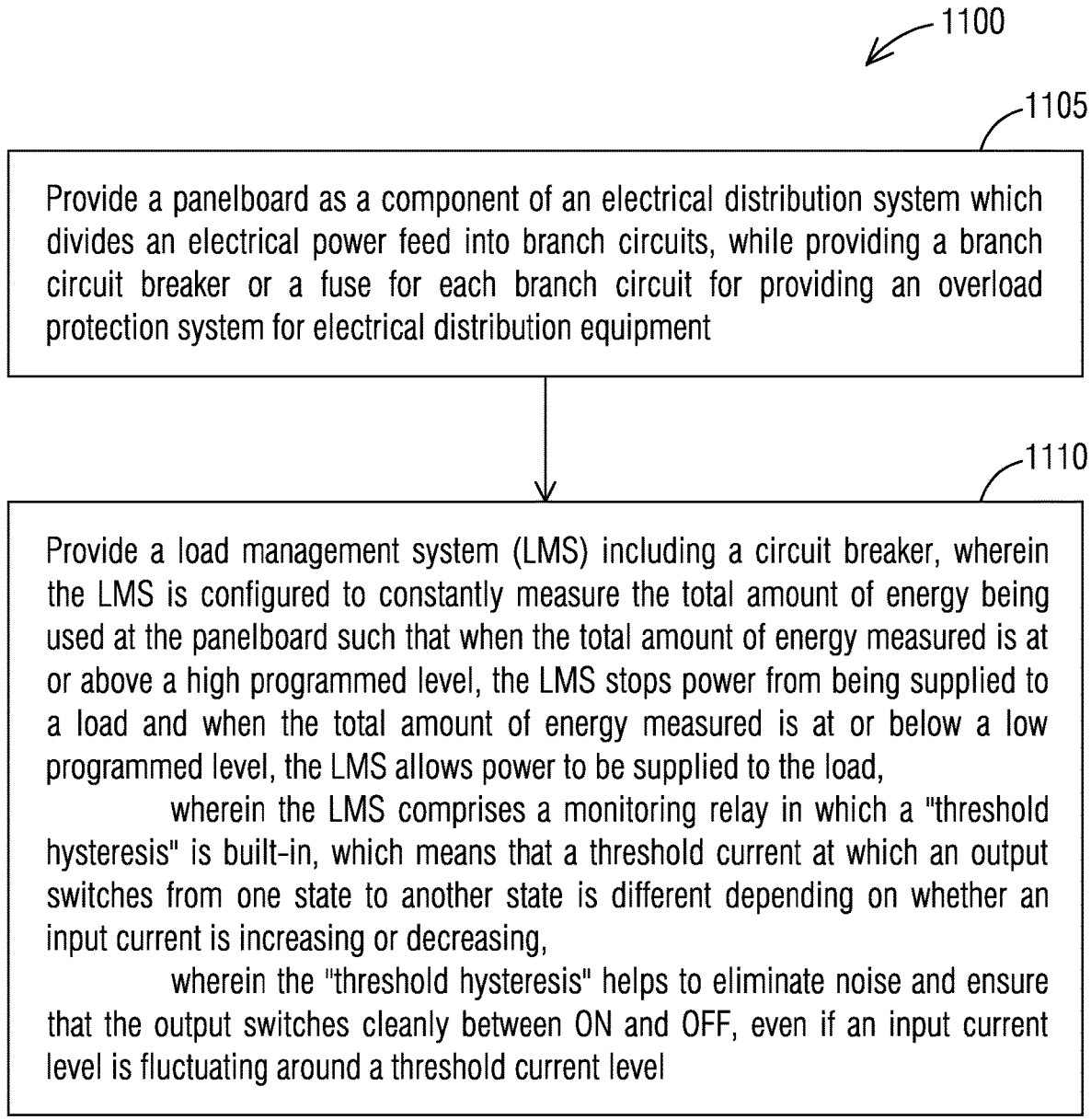
FIG. 11 illustrates a method for providing an overload protection system for electrical distribution equipment in accordance with an exemplary embodiment of the present invention.

FIG. 11 illustrates a method 1100 for providing an overload protection system for electrical distribution equipment in accordance with an exemplary embodiment of the present invention. Reference is made to the elements and features described in FIGS. 1-10. It should be appreciated that some steps are not required to be performed in any particular order, and that some steps are optional.

The method 1100 comprises a step 1105 of providing a panelboard as a component of an electrical distribution system which divides an electrical power feed into branch circuits, while providing a branch circuit breaker or a fuse for each branch circuit. The method 1100 further comprises a step 1110 of providing a load management system (LMS) including a circuit breaker. The LMS is configured to constantly measure the total amount of energy being used at the panelboard such that when the total amount of energy measured is at or above a high programmed level, the LMS stops power from being supplied to a load and when the total amount of energy measured is at or below a low programmed level, the LMS allows power to be supplied to the load.

The LMS comprises a monitoring relay in which a "threshold hysteresis" is built-in, which means that a threshold current at which an output switches from one state to another state is different depending on whether an input current is increasing or decreasing. The "threshold hysteresis" helps to eliminate noise and ensure that the output switches cleanly between ON and OFF, even if an input current level is fluctuating around a threshold current level.

In accordance with one exemplary embodiment, a kit of a load management system (LMS) for forming an overload protection system for electrical distribution equipment. The kit comprises a plurality of current transformers (CT's), a circuit breaker, a monitoring relay and a contactor. The plurality of current transformers (CT's), the circuit breaker, the monitoring relay and the contactor all mounted on a plate and all prewired or not with connections between the circuit breaker, the monitoring relay and the contactor except the plurality of current transformers CTs. The kit may be configured to be installed in the field.

While load manager components as factory installed described here a range of one or more other types of configurations are also contemplated by the present invention. For example, other types of configurations where components can be sold separately as an accessory may be implemented based on one or more features presented above without deviating from the spirit of the present invention.

The techniques described herein can be particularly useful for an EV Charger. While particular embodiments are described in terms of the EV Charger, the techniques described herein are not limited to the EV Charger but can also be used with other electrical loads such as a water heater, or a pump.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. An overload protection system for electrical distribution equipment, the overload protection system comprising:
   a panelboard as a component of an electrical distribution system which divides an electrical power feed into branch circuits, while providing an overcurrent protective device for each branch circuit; and
   a load management system (LMS) including a circuit breaker or a fuse, wherein the LMS is configured to constantly measure a total amount of energy being used at the panelboard such that when the total amount of energy measured is at or above a high programmed level, the LMS stops power from being supplied to a load and when the total amount of energy measured is at or below a low programmed level, the LMS allows power to be supplied to the load,
   wherein the LMS comprises a monitoring relay in which a "threshold hysteresis" is built-in, which means that a threshold current at which an output switches from one state to another state is different depending on whether an input current is increasing or decreasing, and
   wherein the "threshold hysteresis" assists to eliminate noise and ensure that the output switches accurately between ON and OFF, even if an input current level is fluctuating around a threshold current level.

2. The overload protection system of claim 1,
   wherein the panelboard further comprises:
   a plurality of current transformers that are installed on a line side of equipment where LMS applications are needed.

3. The overload protection system of claim 1,
   wherein the LMS further comprises:
   an enclosure to house LMS components; and
   a low power circuit protector being the circuit breaker or the fuse to protect low power wiring and components.

4. The overload protection system of claim 3,
   wherein the LMS further comprises:
   a contactor controlled by the monitoring relay, wherein the contactor acts as a switch between a branch circuit breaker in the panelboard and the load, and wherein the contactor having a coil and an on-off mechanism which is controlled by the monitoring relay such that the monitoring relay provides or suspends power to the coil.

5. The overload protection system of claim 4,
   wherein the monitoring relay receives power from the branch circuit breaker,
   wherein the monitoring relay receives the power to function, from the circuit breaker inside the LMS, and
   wherein the monitoring relay is also connected to the branch circuit breaker but it acts as a switch between the branch circuit breaker and the coil in the contactor.

6. The overload protection system of claim 5,
   wherein the monitoring relay holds a program with high/low limits to operate the contactor.

7. The overload protection system of claim 6,
   wherein the contactor opens or closes a circuit to the load.

8. The overload protection system of claim 7, further comprising:
   a control input/coil as part of a unit of the contactor.

9. The overload protection system of claim 1,
   wherein the load is any electrical load including an electrical vehicle (EV) charger, a water heater, or a pump.

10. The overload protection system of claim 1, further comprising:
    an enclosure to house an electrical distribution equipment which is a combination of a meter socket and/or a load center.

11. The overload protection system of claim 1,
    wherein the LMS is a solid-state unit where a contactor, the monitoring relay and low power circuit protection are configured and built to be a single unit,
    wherein the solid-state unit of the LMS is configured to be installed in a box by itself, and
    wherein the solid-state unit of the LMS is configured to be installed inside as a component of an electrical distribution system.

12. The overload protection system of claim 11,
    wherein the LMS transmits status of a state to another supervisory system.

13. The overload protection system of claim 1,
    wherein the LMS is configured to communicate to another LMS within the same facility such that control of one LMS is a result from another LMS.

14. The overload protection system of claim 1,
    wherein the LMS monitors wires that are part of a system that provides energy level for wire-breaks.

15. The overload protection system of claim 1, wherein the LMS is configured to select between two sources depending on an available energy level.

16. The overload protection system of claim 1, wherein the LMS is controllable remotely by a user via a mobile app or other common means such that communication occurs between the user and the monitoring relay, wherein the monitoring relay sends/receives commands to/from a connected load.

17. The overload protection system of claim 1, wherein the LMS is configured to set a power demand for compatible devices with communication including electrical vehicle (EV) chargers, wherein the LMS uses a HIGH level from the "threshold hysteresis" to reduce a load level dynamically to a connected load.

18. The overload protection system of claim 1, wherein schedules are programmable for time-of-use or other common load management methods based on learned user habits, wherein the learned user habits are manually programmable by a user or trained using an artificial intelligence program in the monitoring relay.

19. A method for providing an overload protection system for electrical distribution equipment, the method comprising:
providing a panelboard as a component of an electrical distribution system which divides an electrical power feed into branch circuits, while providing an overcurrent protective device for each branch circuit; and
providing a load management system (LMS) including a circuit breaker or a fuse, wherein the LMS is configured to constantly measure a total amount of energy being used at the panelboard such that when the total amount of energy measured is at or above a high programmed level, the LMS stops power from being supplied to a load and when the total amount of energy measured is at or below a low programmed level, the LMS allows power to be supplied to the load,
wherein the LMS comprises a monitoring relay in which a "threshold hysteresis" is built-in, which means that a threshold current at which an output switches from one state to another state is different depending on whether an input current is increasing or decreasing, and
wherein the "threshold hysteresis" assists to eliminate noise and ensure that the output switches accurately between ON and OFF, even if an input current level is fluctuating around a threshold current level.

20. The method of claim 19, wherein the panelboard further comprises:
a plurality of current transformers that are installed on a line side of equipment where LMS applications are needed.

21. The method of claim 19, wherein the LMS further comprising:
an enclosure to house LMS components;
a low power circuit protector being the circuit breaker or a fuse to protect low power wiring and components; and
a contactor controlled by the monitoring relay, wherein the contactor acts as a switch between a branch circuit breaker in the panelboard and the load, and wherein the contactor having a coil and an on-off mechanism which is controlled by the monitoring relay such that the monitoring relay provides or suspends power to the coil, wherein the monitoring relay receives power from the branch circuit breaker,
wherein the monitoring relay receives the power to function, from the circuit breaker inside the LMS,
wherein the monitoring relay is also connected to the branch circuit breaker and acts as a switch between the branch circuit breaker and the coil in the contactor, and
wherein the monitoring relay holds a program with high/low limits to operate the contactor and wherein the contactor opens or closes a circuit to the load.

22. The method of claim 19, wherein the LMS can communicate to another LMS within the same facility such that control of one LMS is a result from another LMS.

23. The method of claim 19, wherein the LMS monitors wires that are part of a system that provides energy level for wire-breaks.

24. The method of claim 19, wherein the LMS is configured to select between two sources depending on an available energy level.

25. A kit of a load management system (LMS) for forming an overload protection system for electrical distribution equipment, the kit comprising:
a plurality of current transformers;
a circuit breaker;
a monitoring relay; and
a contactor,
wherein the plurality of current transformers, the circuit breaker, the monitoring relay and the contactor are mounted on a plate and are prewired with connections between the circuit breaker, the monitoring relay and the contactor except the plurality of current transformers,
wherein the LMS is configured to constantly measure a total amount of energy being used at a panelboard such that when the total amount of energy measured is at or above a high programmed level, the LMS stops power from being supplied to a load and when the total amount of energy measured is at or below a low programmed level, the LMS allows power to be supplied to the load,
wherein the LMS comprises a monitoring relay in which a "threshold hysteresis" is built-in, which means that a threshold current at which an output switches from one state to another state is different depending on whether an input current is increasing or decreasing, and
wherein the "threshold hysteresis" assists to eliminate noise and ensure that the output switches accurately between ON and OFF, even if an input current level is fluctuating around a threshold current level, and
wherein the kit is configured to be installed in the field.

* * * * *